(12) United States Patent
Shibata

(10) Patent No.: US 11,614,907 B2
(45) Date of Patent: Mar. 28, 2023

(54) IMAGE FORMING APPARATUS THAT FORMS IMAGE ACCORDING TO INSTRUCTION FROM REMOTE LOCATION

(71) Applicant: KYOCERA Document Solutions Inc., Osaka (JP)

(72) Inventor: Yukihiro Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/690,377

(22) Filed: Mar. 9, 2022

(65) Prior Publication Data

US 2022/0291885 A1 Sep. 15, 2022

(30) Foreign Application Priority Data

Mar. 12, 2021 (JP) .............................. JP2021-040425

(51) Int. Cl.
*G06F 3/12* (2006.01)

(52) U.S. Cl.
CPC .......... *G06F 3/1267* (2013.01); *G06F 3/1203* (2013.01); *G06F 3/126* (2013.01); *G06F 3/1222* (2013.01); *G06F 3/1234* (2013.01); *G06F 3/1268* (2013.01); *G06F 3/1274* (2013.01); *G06F 3/1286* (2013.01); *G06F 3/1287* (2013.01); *G06F 3/1293* (2013.01)

(58) Field of Classification Search
CPC .... G06F 3/1267; G06F 3/1203; G06F 3/1222; G06F 3/126; G06F 3/1234; G06F 3/1268; G06F 3/1274; G06F 3/1286; G06F 3/1287; G06F 3/1293; G06F 3/1238; G06F 3/1285
See application file for complete search history.

(56) References Cited

U.S. PATENT DOCUMENTS

| | | | |
|---|---|---|---|
| 9,251,450 B2* | 2/2016 | Arai | G06F 3/1285 |
| 2008/0218814 A1* | 9/2008 | Ferlitsch | H04N 1/6011 |
| | | | 358/500 |
| 2016/0381242 A1* | 12/2016 | Arakawa | H04N 1/00915 |
| | | | 358/1.14 |

FOREIGN PATENT DOCUMENTS

| | | |
|---|---|---|
| JP | 2004064715 A | 2/2004 |
| JP | 2012118922 A | 6/2012 |
| JP | 2014037069 A | 2/2014 |
| JP | 2016043652 A | 4/2016 |

* cited by examiner

*Primary Examiner* — John R Wallace

(57) ABSTRACT

An image forming apparatus includes a confirmer, a response receiver, and a controller. The confirmer causes the image forming device to stand by, without starting production of a printed material, upon deciding that a print request has been sent from a remote location distant from the image forming apparatus, and transmits, through a network I/F, a request for final confirmation just before starting, about whether the production of the printed material may be started, to a user of a terminal device that transmitted the print request. The response receiver receives a response to the final confirmation, from the terminal device owned by the user. The controller causes the image forming device to start the production of the printed material, upon deciding that the response from the user received by the response receiver indicates permission to start the production of the printed material.

4 Claims, 6 Drawing Sheets

IMAGE FORMING APPARATUS THAT FORMS IMAGE ACCORDING TO INSTRUCTION FROM REMOTE LOCATION

INCORPORATION BY REFERENCE

This application claims priority to Japanese Patent Application No. 2021-040425 filed on Mar. 12, 2021, the entire contents of which are incorporated by reference herein.

BACKGROUND

The present disclosure relates to an image forming apparatus that operates according to an instruction from a remote location.

Image forming apparatuses that can be operated from a remote location are known. For example, a system to change a printing process, depending on how close a user's mobile terminal is to the image forming apparatus, has been proposed. In addition, a system for preventing leakage of information from a printed material has been proposed, in which the printing process is changed according to a distance between the image forming apparatus and the print requester (user), and a distance between the image forming apparatus and a third-party person. Further, a system to reduce the waiting time of the user for the print job, by executing the printing operation when the user has come close to the image forming apparatus, has been proposed.

SUMMARY

The disclosure proposes further improvement of the foregoing techniques.

In an aspect, the disclosure provides an image forming apparatus including an image forming device, a communication device, and a control device. The image forming device forms an image on a recording sheet, thereby producing a printed material. The communication device enables data communication with a terminal device. The control device includes a processor, and acts as a controller, a confirmer, and a response receiver, when the processor executes a control program. The controller controls the image forming device, upon receipt of a print request including print image data transmitted from the terminal device, through the communication device, to form an image represented by the print image data on the recording sheet according to the print request received, thus to produce the printed material. The confirmer causes the image forming device to stand by, without starting the production of the printed material, upon deciding that the print request has been sent from a predetermined remote location distant from an installation site of the image forming apparatus, and transmits a request for final confirmation whether the production of the printed material may be started, to the terminal device through the communication device. The response receiver receives a response to the request for final confirmation, from the terminal device. The controller further causes the image forming device to start the production of the printed material, upon deciding that the response received by the response receiver indicates permission to start the production of the printed material.

DETAILED DESCRIPTION

Figure 1:
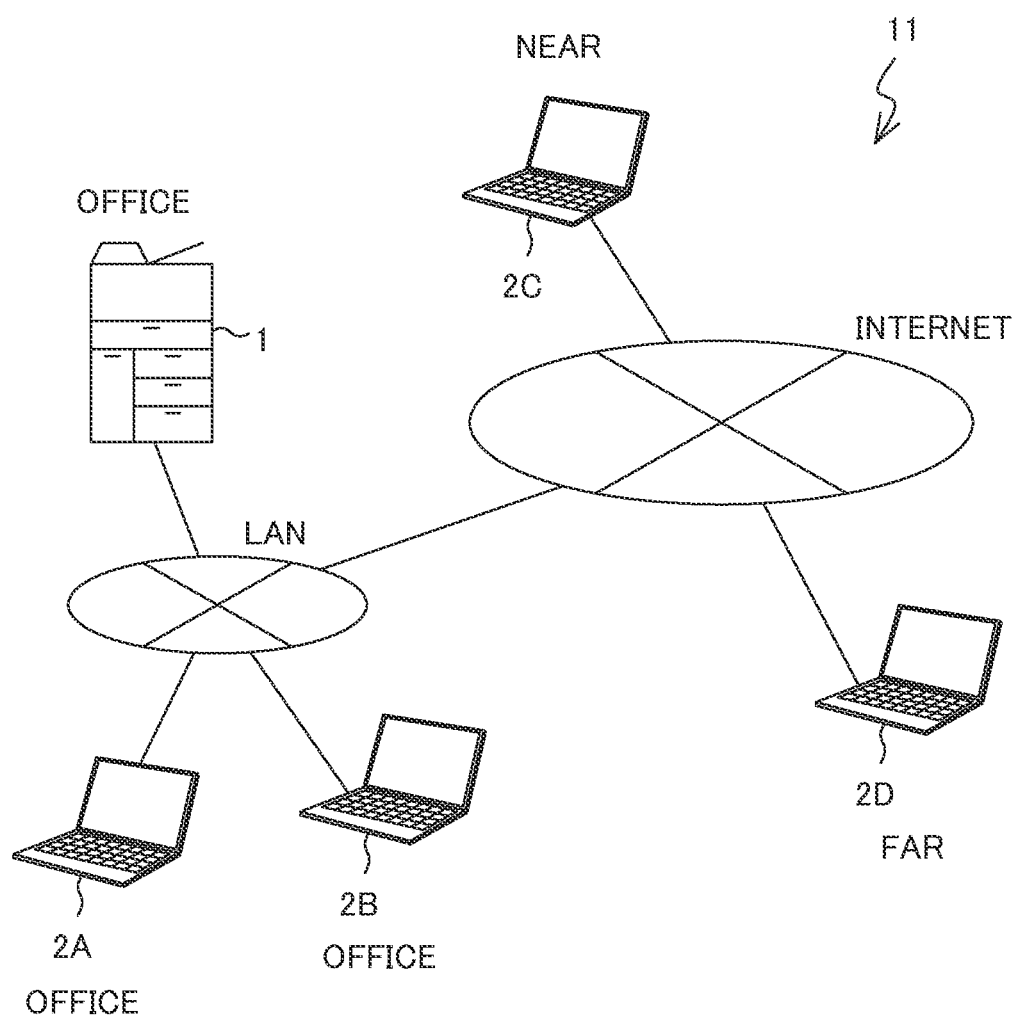
FIG. 1 is a schematic diagram showing a general configuration of an image forming system including an image forming apparatus according to an embodiment of the disclosure.

Hereafter, an image forming apparatus according to an embodiment of the disclosure will be described, with reference to the drawings. FIG. 1 is a schematic diagram showing a general configuration of an image forming system including the image forming apparatus according to the embodiment of the disclosure.

The image forming system 11 includes an image forming apparatus 1 and terminal devices 2A and 2B, installed in an office of a company, and terminal devices 2C and 2D used in a location other than the office, for example a user's home, the image forming apparatus 1, the terminal devices 2A and 2B, and the terminal devices 2C and 2D being connected to each other via a network such as the internet. The image forming apparatus 1 and the terminal device 2A and 2B are connected via an in-house network. The terminal devices 2C and 2D are installed at predetermined remote locations, the terminal device 2C being located near the office, and the terminal device 2D being located far from the office.

The image forming apparatus 1 is a multifunction peripheral having a plurality of functions, such as copying, printing, scanning, and facsimile transmission. The terminal devices 2A, 2B, 2C, and 2D (hereinafter, "terminal device 2" where appropriate) are personal computers for example, and configured to request the image forming apparatus 1 to perform a printing job.

Figure 2:
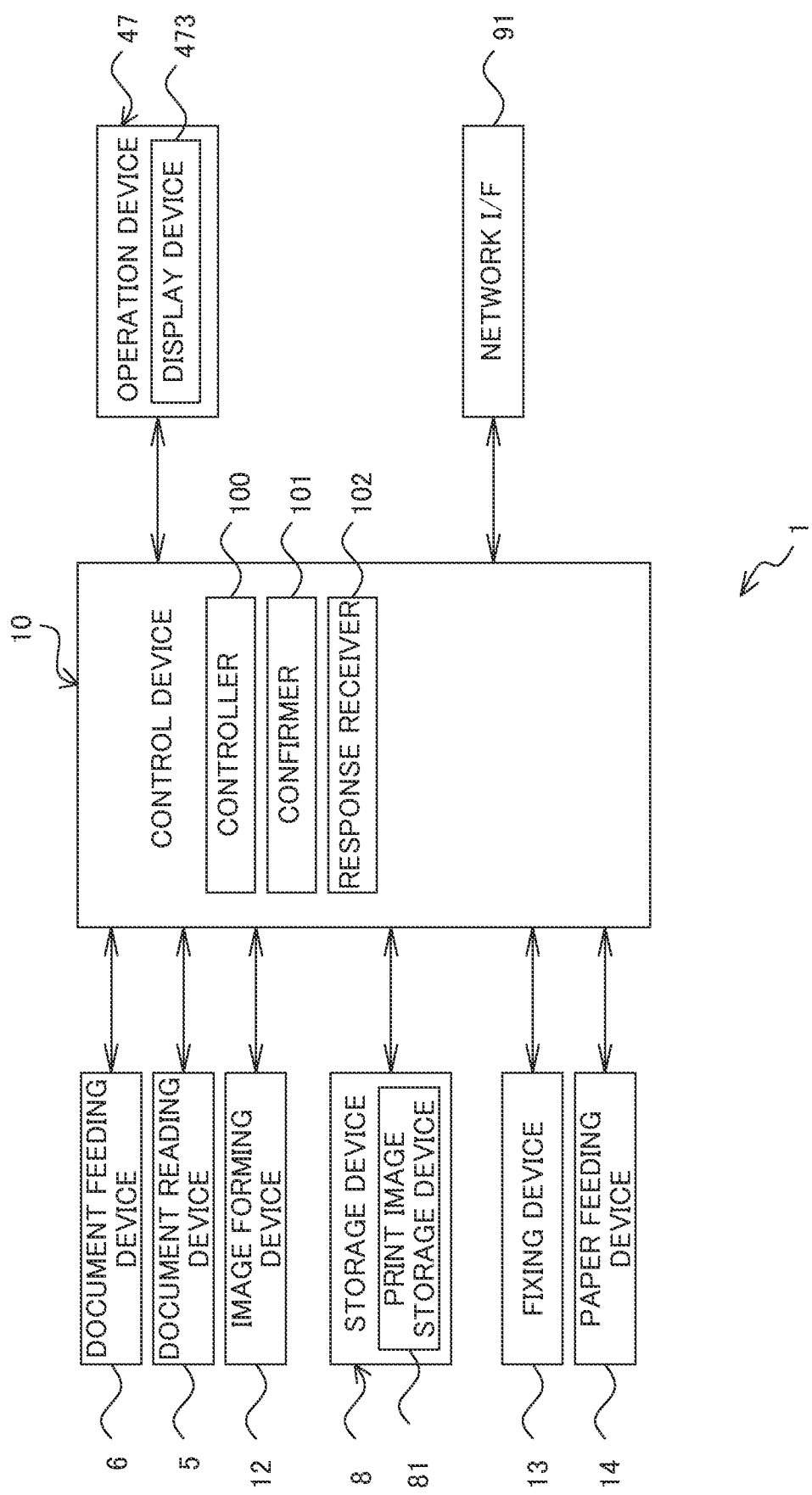
FIG. 2 is a functional block diagram schematically showing an essential internal configuration of the image forming apparatus according to the embodiment of the disclosure.

FIG. 2 is a functional block diagram schematically showing an essential internal configuration of the image forming apparatus according to the embodiment of the disclosure. The image forming apparatus 1 includes a control device 10, a document feeding device 6, a document reading device 5, an image forming device 12, a storage device 8, a fixing device 13, a paper feeding device 14, an operation device 47, and a network interface (I/F) 91.

The document feeding device 6 is openably connected to the upper face of the document reading device 5, via a non-illustrated hinge. The document feeding device 6 serves as a document retention cover, when the document reading device 5 reads a source document placed on a non-illustrated platen glass. The document feeding device 6 is an automatic document feeder (ADF) including a non-illustrated document tray, and delivers the source documents placed on the document tray to the document reading device 5.

To perform the document reading operation, the image forming apparatus 1 operates as follows. The document reading device 5 optically reads the image on a source document delivered from the document feeding device 6 to the document reading device 5, or placed on the platen glass, and generates image data. The image data generated by the document reading device 5 is stored, for example, in a non-illustrated image memory.

To perform the image forming operation, the image forming apparatus 1 operates as follows. The image forming device 12 forms a toner image on a recording sheet serving as a recording medium, delivered from the paper feeding device 14, on the basis of the image data generated through the document reading operation, the image data stored in the image memory, or image data received from a computer connected via a network. Here, the image forming device 12 is an image forming mechanism including a development device, a photoconductor drum, a charging device, an exposure device, a primary transfer roller, a secondary transfer roller, and a fixing device.

The fixing device 13 heats and presses the recording sheet on which the toner image has been formed by the image forming device 12, to thereby fix the toner image onto the recording sheet, and the recording sheet that has undergone the fixing process is delivered to a non-illustrated output tray. The paper feeding device 14 includes a paper cassette.

The storage device 8 is, for example, a hard disk drive (HDD) or a solid-state drive (SSD), and contains various control programs. In addition, the storage device 8 includes a print image storage region 81. The print image storage region 81 is used to store print image data.

The operation device 47 receives instructions from the user to execute the functions and operations that the image forming apparatus 1 is configured to perform, such as an image forming operation. The operation device 47 includes a display unit 473 for displaying, for example, an operation guide for the user. The operation device 47 also receives, through a touch panel provided on the display device 473, an input of a user's instruction based on an operation performed by the user on the operation screen of the display device 473 (touch operation).

The display device 473 includes, for example, a liquid crystal display (LCD). The display device 473 includes the touch panel. When the user touches a button or a key displayed on the screen, the touch panel receives the instruction corresponding to the touched position.

The network I/F 91 is a communication interface that transmits and receives various types of data to and from external devices inside a local area, or on the internet (e.g., terminal device 2). The network I/F 91 exemplifies the communication device in the disclosure.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100, a confirmer 101, and a response receiver 102.

The control device 10 acts as the controller 100, the confirmer 101, and the response receiver 102, when the processor operates according to a control program stored in the storage device 8. Here, the controller 100 and the related components may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the storage device 8, the operation device 47, and the network I/F 91, and controls the operation of the mentioned components. For example, the controller 100 controls, upon receipt of a print request R (print image data inclusive) transmitted from the terminal device 2 (see FIG. 1), through the network I/F 91, the image forming device 12 so as to form the image represented by the print image data on the recording sheet, according to the print request R received, thereby producing a printed material.

The controller 100 also causes the display device 473 to display a list of the print image data stored in the print image storage region 81, according to the user's instruction received by the operation device 47. When the print image data is selected from the list, and the operation device 47 receives the printing instruction, the controller 100 controls the image forming device 12 so as form the image represented by the print image data selected by the user, on the recording sheet, thus producing a printed material.

The confirmer 101 causes the image forming device 12 to stand by, without starting the production of the printed material, upon deciding that the print request R received through the network I/F 91 has been sent from a predetermined remote location, and transmits, through the network I/F 91, a request for final confirmation just before starting, about whether the production of the printed material may be started, to the terminal device owned by the user who transmitted the print request R, through the communication device. The predetermined remote location refers to a location outside the room that is the installation site L of the image forming apparatus 1, and distant from the installation site L (e.g., a location outside the region of the LAN to which the image forming apparatus 1 is connected). The confirmer 101 decides whether the print request R has been sent from such remote location, on the basis of, for example, the IP address of the terminal device that has outputted the print request R to the image forming apparatus 1.

Further, upon deciding that the print request R has been transmitted from the terminal device 2 located at the remote location, and that the distance between the terminal device 2 that has transmitted the print request R and the image forming apparatus 1 is equal to or longer than a predetermined threshold (e.g., 100 meters) (i.e., that the print request R has been transmitted from a far place, not from a near place), the confirmer 101 transmits, before performing the final confirmation, a message enquiring whether the print request R is free from an error, to the terminal device 2 owned by the user, through the network I/F 91. Hereinafter, the transmission of the enquiry to the terminal device 2 will be referred to as "enquiring to the terminal device 2".

The response receiver 102 receives the response from the terminal device 2 owned by the user, through the network I/F 91. For example, the response receiver 102 receives the response to the final confirmation, from the terminal device 2 owned by the user.

The controller 100 further starts the production of the printed material, upon deciding that the response receiver 102 has received the response from the user, and that the user has permitted to start the production of the printed material.

Figure 3:
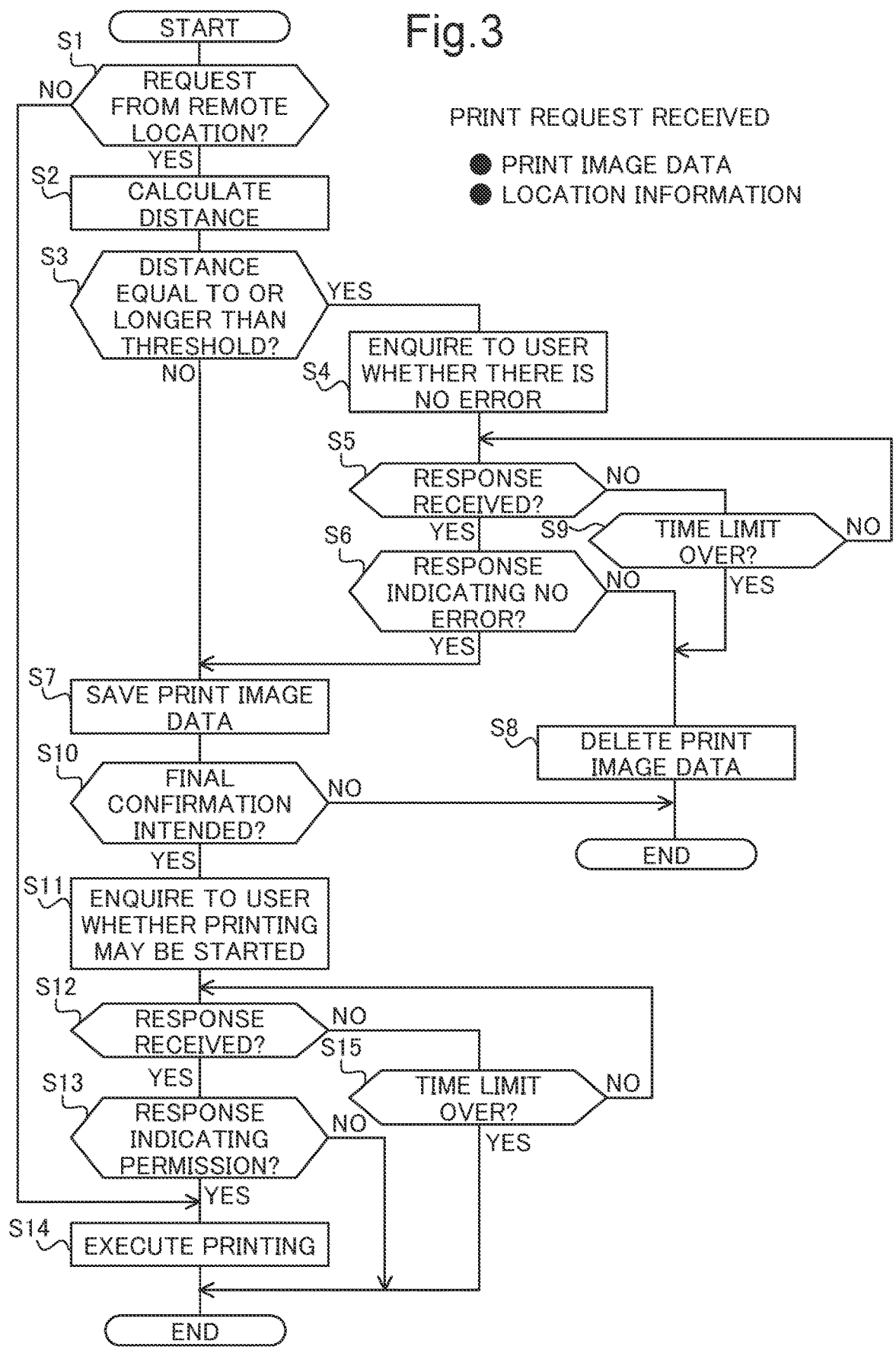
FIG. 3 is a flowchart showing an example of operations performed by the image forming apparatus according to the embodiment.

Referring now to a flowchart shown in FIG. 3, an example of the operation performed by the control device 10 of the image forming apparatus 1 according to a first embodiment will be described hereunder. The following operation is to be performed when the controller 100 decides that the print request R (including print image data and location information of the terminal device 2) transmitted from the terminal device 2 has been received.

The confirmer 101 decides whether the print request R has been sent from a location distant from the installation site L of the image forming apparatus 1, in other words from the remote location (S1). In this embodiment, the IP address assigned to the terminal device 2 is utilized, to make the mentioned decision.

The confirmer 101 decides whether the print request R has been sent from the remote location, on the basis of the IP address assigned to the terminal device 2 that has transmitted the print request R. The IP address of the terminal device 2A or 2B connected to the in-house network is a private address, and the IP address of the terminal device 2C or 2D connected to an external network is a global address. When the IP address of the terminal device 2 that has transmitted the print request R is not a private address, the confirmer 101 decides that the print request R has been sent from the remote location.

Upon deciding that the print request R has been sent from the remote location (YES at S1), the confirmer 101 calculates the distance D between the terminal device 2 and the image forming apparatus 1 (S2), on the basis of the location information of the terminal device 2 included in the print request R, and the preregistered location information (installation location information) of the image forming apparatus 1, and decides whether the calculated distance D is equal to or longer than a predetermined threshold D1 (S3).

Upon deciding that the distance D is equal to or longer than the threshold D1 (e.g., 100 meters) (YES at S3), the confirmer 101 enquires through the network I/F 91, whether the print request R is free from an error (i.e., wrong operation has not been committed), to the terminal device 2 owned by the user who has transmitted the print request R (S4). As a specific example, the confirmer 101 transmits information necessary for such enquiry, to the terminal device 2.

Upon receipt of the mentioned information, the terminal device 2 presents the enquiry to the user on the basis of the information received, for example by displaying a dialog box, and transmits the information indicating the user's response, to the image forming apparatus 1.

Figure 4:
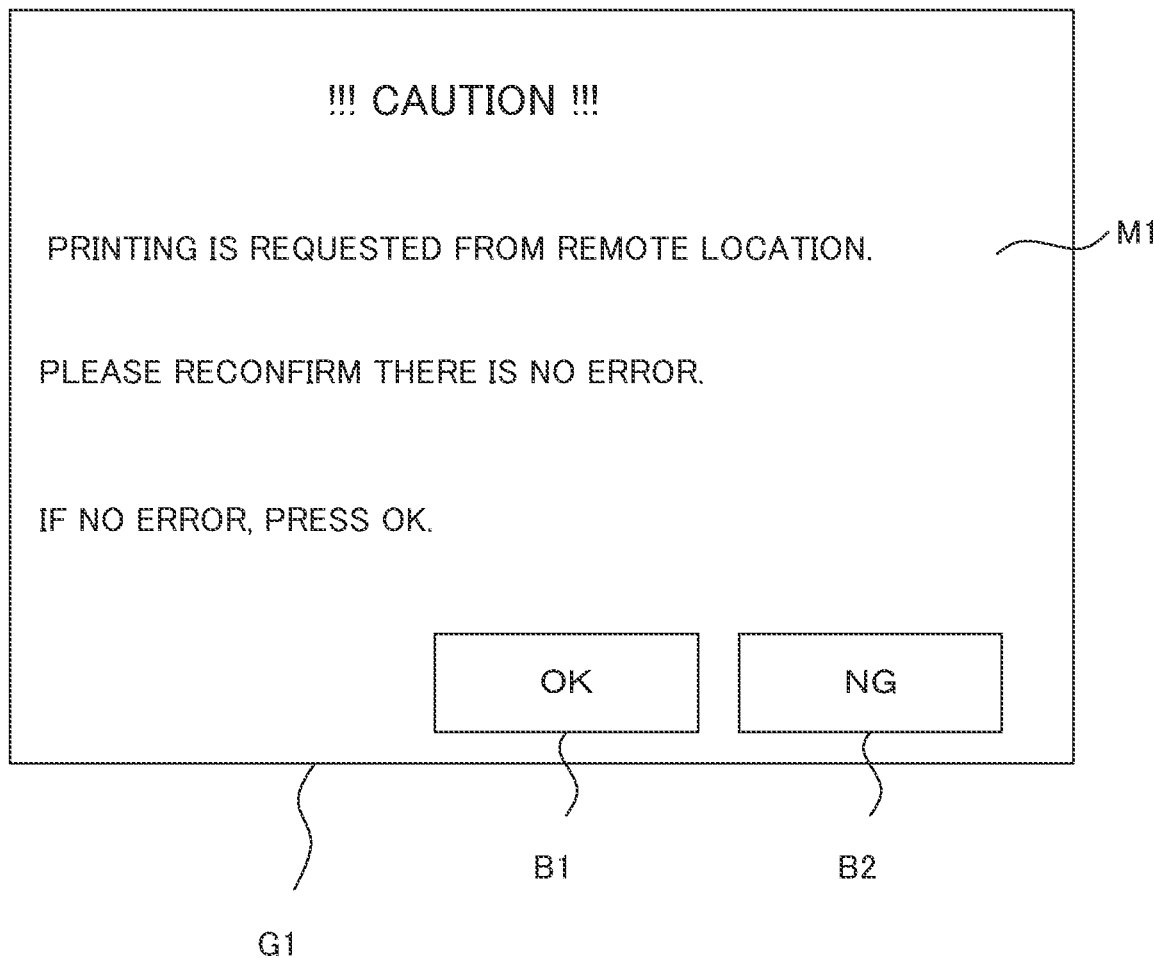
FIG. 4 is a schematic drawing showing an example of operation screens displayed on a terminal device.

FIG. 4 illustrates an example of the operation screen displayed on the terminal device 2. The operation screen G1 shown in FIG. 4 includes a message to the effect that the print request is from a remote location, a message M1 urging the user to confirm that there is no wrong operation (error in the print request), an operation button B1 marked as "OK", and an operation button B2 marked as "NG". The controller of the terminal device 2 receives the user's response that there is no wrong operation (print request R is correct) through the touch panel, when the user touches the operation button B1, or receives the user's response that there has been a wrong operation (print request R is wrong), when the user touches the operation button B2. The controller of the terminal device 2 transmits the information indicating the received response (hereinafter, simply "response") to the image forming apparatus 1, through a communication device that communicates with the image forming apparatus 1, for example through the internet.

The confirmer 101 decides whether the response receiver 102 has received the response from the terminal device 2 (S5), and then decides whether the response is indicating that the print request R is free from an error (S6), upon deciding that the response receiver 102 has received the response from the terminal device 2 (YES at S5).

When the confirmer 101 decides that the response indicating that the print request R is correct has been received (YES at S6), the controller 100 saves the print image data included in the print request R, in the print image storage region 81 (S7).

In contrast, when the confirmer 101 decides that the response indicating that the print request R is wrong has been received (NO at S6), the controller 100 deletes the print image data included in the print request R, from the memory in which the print image data has been temporarily stored (S8). Thereafter, the operation is finished.

Here, upon deciding that the response receiver 102 has not received the response from the terminal device 2 yet (NO at S5), the confirmer 101 decides whether an elapsed time T1, from the time point that the enquiry was transmitted, is equal to or longer than a predetermined threshold TH1 (e.g., 60 seconds) (S9).

When the confirmer 101 decides that the elapsed time T1 is equal to or longer than the threshold TH1 (YES at S9), the controller 100 decides that a time limit is over, and deletes the print image data included in the print request R, from the memory in which the print image data has been temporarily stored (S8). Thereafter, the operation is finished. In contrast, when the confirmer 101 decides that the elapsed time T1 is shorter than the threshold TH1 (NO at S9), the operation returns to S5.

When the confirmer 101 decides at S3 that the distance D is shorter than the threshold D1 (i.e., the print request R has been sent from a nearby location) (NO at S3), the controller 100 saves the print image data included in the print request R in the print image storage region 81 (S7), without confirming whether the print request R is wrong.

Then the confirmer 101 looks up the user setting stored in the controller 100, to thereby decide whether the user wishes to transmit the final confirmation to the terminal device (S10). Upon deciding that the user setting indicates that the user wishes to transmit the final confirmation (YES at S10), the confirmer 101 transmits, through the network I/F 91, the final confirmation to the terminal device 2 owned by the user who transmitted the print request R (S11). As a specific example, the confirmer 101 transmits the information necessary for the enquiry, to the terminal device 2.

Upon receipt of the mentioned information, the terminal device 2 presents the enquiry to the user on the basis of the information received, for example by displaying a dialog box, and stands by for the user's response (OK or NG). The terminal device 2 then transmits the information indicating the user's response, to the image forming apparatus 1.

Figure 5:
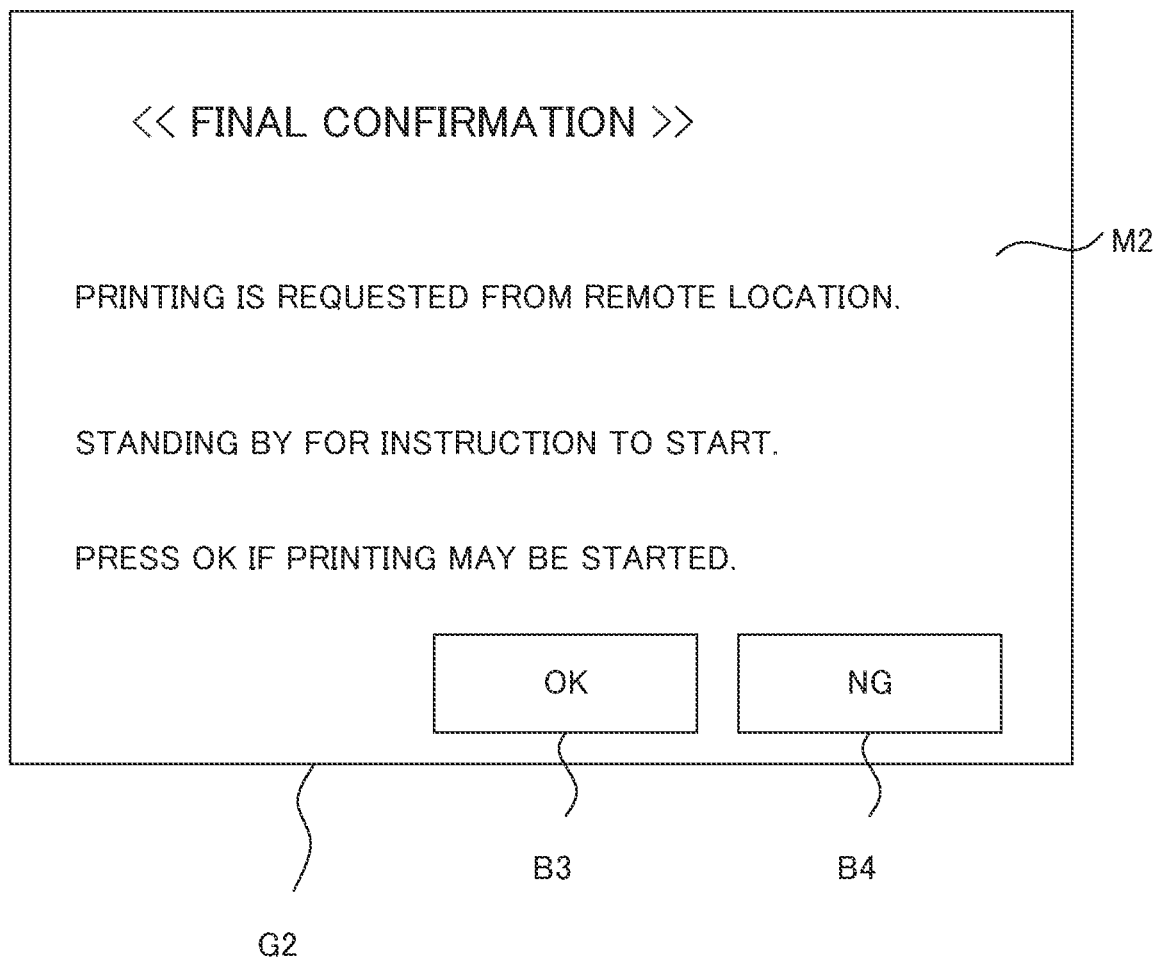
FIG. 5 is a schematic drawing showing another example of the operation screens displayed on the terminal device.

FIG. 5 illustrates another example of the operation screen displayed on the terminal device 2. The operation screen G2 shown in FIG. 5 includes a message to the effect that the print request is from a remote location, a message M2 indicating that the final confirmation is in process as to whether the printing may be started, an operation button B3 marked as "OK", and an operation button B4 marked as "NG". The controller of the terminal device 2 receives the user's response that the printing may be started, through the touch panel, when the user touches the operation button B3, or receives the user's response that the printing should not be started, when the user touches the operation button B4. The controller of the terminal device 2 transmits the information indicating the received response (hereinafter, simply "response") to the image forming apparatus 1, through the communication device that communicates with the image forming apparatus 1, for example through the internet.

The controller 100 decides whether the response receiver 102 has received the response from the terminal device 2 (S12), and then decides whether the response is indicating that the production of the printed material may be started (S13), upon deciding that the response receiver 102 has received the response from the terminal device 2 (YES at S12).

Upon deciding that the response is indicating that the production of the printed material may be started (YES at S13), the controller 100 controls the image forming device 12 so as to start the production of the printed material (S14). Thereafter, the operation is finished. In contrast, when the controller 100 decides that the response is indicating that the production of the printed material should not be started (NO at S13), the operation is finished.

Upon deciding that the response receiver 102 has not received the response from the terminal device 2 yet (NO at S12), the controller 100 decides whether an elapsed time T2, from the time point that the confirmer 101 sent the enquiry, is equal to or longer than a predetermined threshold TH2 (e.g., 60 seconds) (S15).

Upon deciding that the elapsed time T2 is equal to or longer than the threshold TH2 (YES at S15), the controller 100 decides that a time limit is over, and finishes the operation. In contrast, upon deciding that the elapsed time T2 is shorter than the threshold TH2 (NO at S15), the operation returns to S12.

Here, in the case where the confirmer 101 decides at S1 that the print request R has not been sent from the remote location (print request R has been sent from a place near the installation location L) (NO at S1), the controller 100 controls the operation of the image forming device 12 as usual, according to the print request R, so as to produce the printed material (S14). Thereafter, the operation is finished.

According to the first embodiment, when the print request is sent from the remote location, the production of the printed material is not immediately started, but the final confirmation is requested to the user, as to whether the production of the printed material may be started. If the user permits, the production of the printed material is started, but not, in the negative case. In other words, the user can have the opportunity to confirm whether production of a printing material unintended by the user can be avoided.

Thus, when the print request is sent from the remote location, the opportunity for final confirmation is given to the user, and therefore the production of a printing material unintended by the user can be avoided. In addition, there is no need for the image forming apparatus to keep monitoring the location of the user. Therefore, the production of a printed material unintended by the user can be prevented, although the print request is sent from a remote location, without the need to further complicate the configuration of the apparatus.

According to the foregoing embodiment, when the print request is sent from a remote location, not from a nearby place, the enquiry whether the print request is free from an error is sent to the user, before the final confirmation is made. Therefore, the print request from the remote location can be handled more carefully.

In addition, since the print image data, the printing of which has been requested from a nearby location, is stored in the print image storage region 81, the image represented by the print image data can be formed on the recording sheet, thus to produce the printed material, by directly operating the operation device 47 of the image forming apparatus 1, even though the user's permission to start the printing has failed to be obtained.

In the case where the user setting is specified at S10 such that the user does not wish to make the final confirmation (NO at S10), the operation is finished. To be more detailed, the confirmer 101 causes the image forming apparatus 1 to stand by, without starting the production of the printed material, and does not transmit the final confirmation to the terminal device 2. In this case, the user is unable to instruct the image forming apparatus 1 to start the printing, from the remote location. However, the image forming apparatus 1 can execute the printing, when the user directly inputs the instruction to start the printing, through the operation device 47. In other words, in the case where the response from the user to the final confirmation has not been obtained, the image forming apparatus 1 is restricted from executing the printing, unless the user directly inputs the instruction to start the printing. Such an arrangement also prevents the production of an unintended printed material from being executed.

Further, the print image data, the printing of which has been requested from the remote location, is stored in the print image storage region 81 (S7), provided that the user's response that the print request R is free from an error has been obtained (YES at S6). Therefore, the user can form the image represented by the print image data on the recording sheet, thus to produce the printed material, by directly operating the operation device 47 of the image forming apparatus 1 as above, even though the user has not transmitted the response to the final confirmation, from the terminal device 2 to the image forming apparatus 1.

Recently, a work style called "remote work", in which the worker uses the home as workplace instead of the office of the company, has come to gather attention, and is actually prevailing. The user doing the remote work may request, for example, an image forming apparatus, such as a printer, installed in the office in the remote location to perform a printing job, using the remote work environment. In this case, however, a material that is not supposed to be printed may be printed by mistake, owing to a wrong operation by the user, irrespective of whether the print request is made from the office or from a remote location. In the case where the user has requested the printing from the office, the user can immediately collect the printed material that has been printed by mistake. However, in the case where the user has requested the printing from the remote location, it is difficult for the user to immediately collect the printed material, and therefore the printed material is left unattended, for a certain period of time.

When the printed material left unattended contains a confidential matter, a serious problem may be brought about. Accordingly, the user has to be quite careful, to prevent an unintended material from being printed, when sending the print request from a place distant from the installation location of the image forming apparatus. With the technique according to the Background Art, the location of the user has to be constantly monitored, in order to restrict the printing depending on the distance between the image forming apparatus and the user, which may incur further complication of the structure of the apparatus. For example, the image forming apparatus has to constantly recognize the location information of the mobile terminal carried by the user, which keeps changing time after time.

With the configuration according to the first embodiment, unlike the above, a material not intended by the user can be prevented from being printed, in the case of printing based on a request from a remote location, without incurring further complication of the structure of the apparatus.

The messages M1 and M2, respectively shown in FIG. 4 and FIG. 5, are displayed on the terminal device 2 for the user, in the foregoing embodiment. Alternatively, the confirmer 101 of the image forming apparatus 1 may transmit information indicating the distance D between the terminal device 2 and the image forming apparatus 1 to the terminal device 2, so that the actual value of the distance therebetween can be displayed on the terminal device 2. Such an arrangement makes the user clearly aware that the user is sending the printing request from a remote location, to the image forming apparatus 1. In this case, for example, a message or an illustration to such an effect that "a print request is being made from a place 50 km away from the office" is displayed on the terminal device 2.

Figure 6:
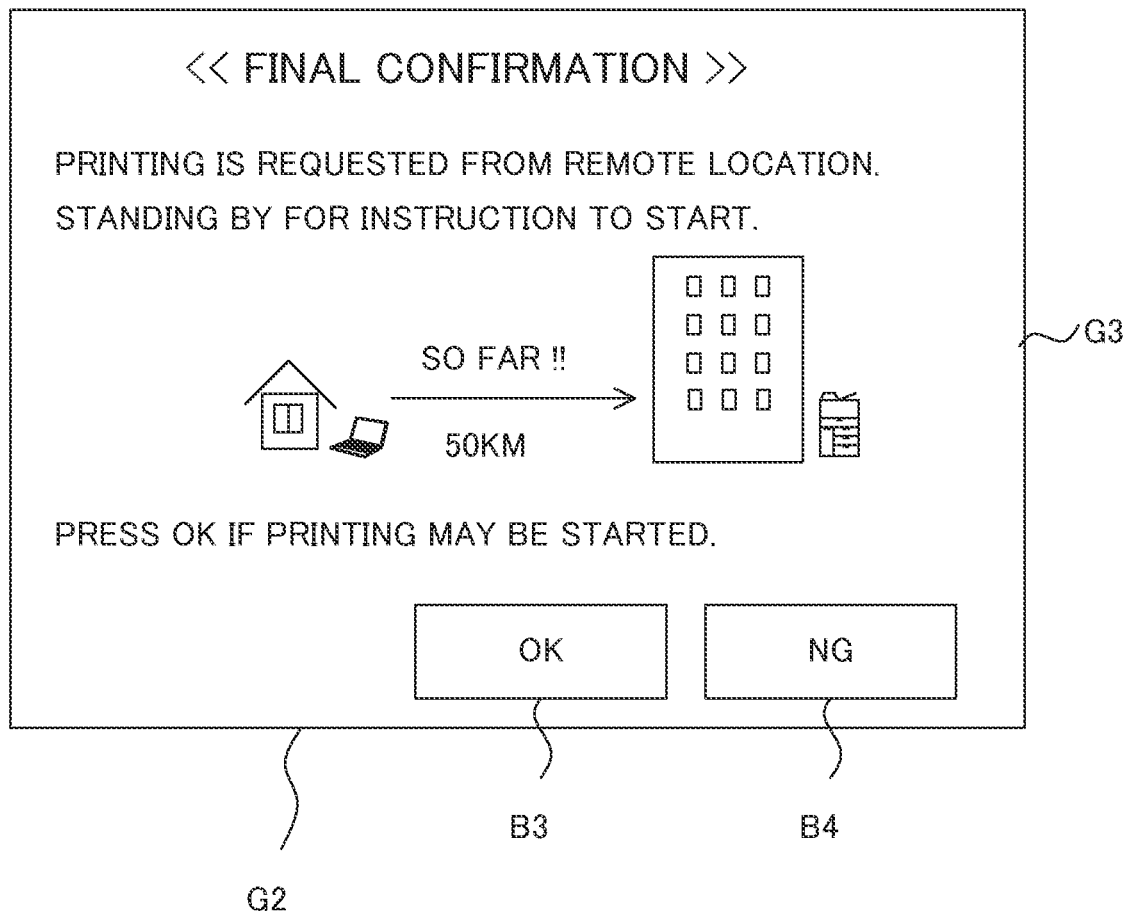
FIG. 6 is a schematic drawing showing still another example of the operation screens displayed on the terminal device.

Further, as another embodiment, the confirmer 101 of the image forming apparatus 1 may create a conceptual illustration, such as a map indicating the positional relation between the image forming apparatus 1 and the terminal device 2, and transmit the created map data to the terminal device 2, to thereby enable the terminal device 2 to display the conceptual illustration indicating the positional relation, like an operation screen G3 shown in FIG. 6. With such an arrangement, the terminal device 2 facilitates the user thereof to perceive that the user is sending the print request from a place distant from the office.

The disclosure may be modified in various manners, without limitation to the configuration according to the foregoing embodiment. Although the image forming apparatus according to the disclosure is exemplified by the multifunction peripheral in the foregoing embodiment, the disclosure may be applied to a different type of image forming apparatus having the printer function.

The configurations and processings according to the foregoing embodiments, described with reference to FIG. 1 to FIG. 6, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an image forming device that forms an image on a recording sheet, thereby producing a printed material;
a communication device that enables data communication with a terminal device;
a storage device;
an operation device that receives an instruction according to an operation by a user; and
a control device including a processor, and configured to act, when the processor executes a control program, as:
a confirmer that (1) transmits, upon receipt of a print request including print image data transmitted from the terminal device through the communication device, and when the print request has been sent from a predetermined remote location distant from an installation site of the image forming apparatus and a distance between the terminal device and the image forming apparatus is equal to or longer than a predetermined threshold, a first enquiry whether the print request is free from an error, to the terminal device through the communication device, and (2) does not transmit, upon receipt of the print request, and when the print request has been sent from the remote location and the distance between the terminal device and the image forming apparatus is shorter than the threshold, the first enquiry;
a response receiver that receives a response from the terminal device through the communication device; and
a controller that temporary stores, when the print request has been sent from the remote location and the distance between the terminal device and the image forming apparatus is shorter than the threshold, or the response receiver has received a first response indication that the print request is free from an error, the print image data transmitted from the terminal device in the storage device,
wherein the confirmer transmits, when the response receiver has received the first response, a second enquiry whether a production of the printed material may be started to the terminal device through the communication device,
wherein the controller (i) causes, when the response receiver has received a permission response indicating permission to start the production of the printed material within a predetermined time from a time of transmitting the second enquiry, the image forming device to form an image represented by the print image data on the recording sheet, adn (ii) causes, when the response receiver has not received the permission response within the predetermined time, the storage device to maintain the storage of the print image data,
wherein the controller causes, when the operation device receives an instruction to print an image represented by the print image data stored in the storage device, the image forming device to form the image represented by the print image data on the recording sheet.

2. The image forming apparatus according to claim 1, wherein, when a setting that the second enquiry is not to be transmitted to the terminal device is valid, and when the print request has been sent from the remote location and the distance between the terminal device and the image forming apparatus is equal to or longer than the threshold, the confirmer causes the image forming device to stand by, without starting the production of the printed material, and keeps from transmitting the second enquiry to the terminal device.

3. The image forming apparatus according to claim 1, wherein the controller further deletes the print image data transmitted from the terminal device from the storage device, when the response receiver has received the second response indicating that the print request includes an error.

4. The image forming apparatus according to claim 1, wherein, the confirmer transmits information, for displaying the information on a display of the terminal device, indicating a positional relation between the image forming apparatus and the terminal device to the terminal device through the communication device, at least one of when transmitting the first enquiry and when transmitting the second enquiry.

* * * * *